United States Patent
Alimi

(10) Patent No.: US 9,274,149 B2
(45) Date of Patent: Mar. 1, 2016

(54) FREQUENCY PHASE DETECTION THREE PHASE SYSTEM

(75) Inventor: Evropej Alimi, Darien, IL (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 680 days.

(21) Appl. No.: 13/447,849

(22) Filed: Apr. 16, 2012

(65) Prior Publication Data

US 2013/0271114 A1    Oct. 17, 2013

(51) Int. Cl.
*G01R 19/00* (2006.01)
*G06F 1/00* (2006.01)
*G01R 29/16* (2006.01)

(52) U.S. Cl.
CPC ........ *G01R 19/0092* (2013.01); *G01R 19/0053* (2013.01); *G01R 29/16* (2013.01); *G06F 1/00* (2013.01); *G06F 2101/00* (2013.01); *G06F 2201/00* (2013.01)

(58) Field of Classification Search
CPC ... G06F 1/00; G06F 2101/00; G06F 2200/00; G06F 2201/00
USPC ......... 324/66, 98, 100, 101, 102, 103 R, 107, 324/108
See application file for complete search history.

(56) References Cited

U.S. PATENT DOCUMENTS

| | | | |
|---|---|---|---|
| 2,966,629 A * | 12/1960 | Downing, Jr. .......... | G01R 11/52 324/107 |
| 4,284,939 A | 8/1981 | Kawada et al. | |
| 4,307,346 A | 12/1981 | Kurosawa et al. | |
| 4,308,465 A | 12/1981 | Lafuze | |
| 4,341,287 A | 7/1982 | Kuzunuki et al. | |
| 4,347,542 A | 8/1982 | Calhoun | |
| 4,400,659 A | 8/1983 | Barron et al. | |
| 4,409,533 A | 10/1983 | Kawabata | |
| 4,415,783 A | 11/1983 | Hung | |
| 4,479,160 A | 10/1984 | Stacey | |
| 4,502,005 A * | 2/1985 | Lisner et al. ................ | 324/750.3 |
| 4,667,264 A | 5/1987 | Yamazaki et al. | |
| 4,741,023 A | 4/1988 | Lawson | |
| 4,804,067 A | 2/1989 | Kahkipuro | |
| 4,813,025 A | 3/1989 | Rowland et al. | |

(Continued)

FOREIGN PATENT DOCUMENTS

| EP | 0029477 A1 | 6/1981 |
|---|---|---|
| EP | 0051903 B1 | 9/1984 |

(Continued)

*Primary Examiner* — Huy Q Phan
*Assistant Examiner* — Temilade Rhodes-Vivour
(74) *Attorney, Agent, or Firm* — Cantor Colburn LLP

(57) ABSTRACT

A system, method, and apparatus are described for monitoring the operation of a three phase system. In some embodiments, one or more vectors may be generated. The vectors may be indicative of an output of the three phase system. In some embodiments, one or more of the vectors may correspond to a difference of two of the three phases of the three phase system. A gain associated with a third of the vectors may be different from a gain associated with each of the first and the second vectors. The gain associated with the third vector may be maximized. The three vectors may be combined with hardware or software. In some embodiments, frequency content associated with the three phase system may be filtered with hardware or software. For example, filtering may be used to remove frequencies outside of a specified frequency range of interest.

14 Claims, 4 Drawing Sheets

(56) References Cited

U.S. PATENT DOCUMENTS

| | | | |
|---|---|---|---|
| 4,897,599 A * | 1/1990 | Koslar | 324/115 |
| 4,922,195 A | 5/1990 | Cox | |
| 4,967,134 A | 10/1990 | Losic et al. | |
| RE33,519 E | 1/1991 | Ibori et al. | |
| 5,162,723 A * | 11/1992 | Marzalek et al. | 324/76.19 |
| 5,164,966 A | 11/1992 | Hershberger | |
| 5,177,678 A | 1/1993 | Ibori et al. | |
| 5,224,125 A | 6/1993 | Wong et al. | |
| 5,378,979 A * | 1/1995 | Lombardi | 324/107 |
| 5,602,709 A | 2/1997 | Al-Dabbagh | |
| 5,619,406 A * | 4/1997 | Divan et al. | 363/98 |
| 5,650,708 A | 7/1997 | Sawada et al. | |
| 5,757,099 A * | 5/1998 | Cheng et al. | 307/105 |
| 5,789,895 A | 8/1998 | Lee | |
| 5,966,264 A | 10/1999 | Belser et al. | |
| 6,040,742 A | 3/2000 | Bailey et al. | |
| 6,043,715 A | 3/2000 | Bailey et al. | |
| 6,657,500 B1 | 12/2003 | Chen | |
| 6,661,110 B2 | 12/2003 | Suzuki et al. | |
| 6,850,043 B1 | 2/2005 | Maddali | |
| 6,850,074 B2 | 2/2005 | Adams et al. | |
| 6,891,413 B2 | 5/2005 | Okui | |
| 6,925,428 B1 | 8/2005 | Kaminski | |
| 7,032,699 B2 | 4/2006 | Sakata et al. | |
| 7,218,071 B1 | 5/2007 | Welchko et al. | |
| 7,366,271 B2 | 4/2008 | Kim et al. | |
| 7,432,686 B2 | 10/2008 | Erdman et al. | |
| 7,535,120 B2 | 5/2009 | Erdman et al. | |
| 7,541,848 B1 | 6/2009 | Masuda | |
| 7,545,076 B1 | 6/2009 | Hills et al. | |
| 7,561,451 B2 | 7/2009 | Tracy et al. | |
| 7,680,234 B2 | 3/2010 | Colby et al. | |
| 2003/0169029 A1 * | 9/2003 | Piesinger | G01R 29/18 324/66 |
| 2005/0122083 A1 | 6/2005 | Erdman et al. | |
| 2005/0195097 A1 * | 9/2005 | Gondoh | 341/15 |
| 2005/0273207 A1 * | 12/2005 | Dougherty | 700/292 |
| 2007/0005194 A1 | 1/2007 | Chang et al. | |
| 2008/0054839 A1 | 3/2008 | Sasaki et al. | |
| 2008/0100256 A1 | 5/2008 | Maruyama et al. | |
| 2008/0204041 A1 * | 8/2008 | Anderson et al. | 324/629 |
| 2009/0113049 A1 * | 4/2009 | Nasle et al. | 709/224 |
| 2009/0135885 A1 | 5/2009 | Lin | |
| 2009/0219980 A1 | 9/2009 | DiSanto et al. | |
| 2009/0265041 A1 * | 10/2009 | Benjamin | 700/292 |
| 2009/0287463 A1 * | 11/2009 | Turner et al. | 703/2 |
| 2010/0013636 A1 | 1/2010 | Wu | |
| 2010/0052699 A1 * | 3/2010 | Weber et al. | 324/623 |
| 2010/0148753 A1 * | 6/2010 | Ha | H02M 7/53875 324/107 |
| 2010/0231150 A1 | 9/2010 | Tan et al. | |
| 2010/0246734 A1 | 9/2010 | Tamura et al. | |
| 2011/0084643 A1 | 4/2011 | Ams | |
| 2012/0068748 A1 | 3/2012 | Stojanovic et al. | |

FOREIGN PATENT DOCUMENTS

| | | |
|---|---|---|
| EP | 0121792 B1 | 1/1990 |
| EP | 0375285 A2 | 6/1990 |
| EP | 0507511 B1 | 9/1998 |
| EP | 0722220 B1 | 10/1999 |
| EP | 1394948 B1 | 6/2006 |
| EP | 2252003 A1 | 11/2010 |
| EP | 1830096 B1 | 1/2011 |
| EP | 2237472 A1 | 10/2012 |
| GB | 2188802 A | 10/1987 |
| JP | 03-003169 | 1/1991 |
| JP | 04-046567 | 2/1992 |
| JP | 05-325004 | 12/1993 |
| JP | 08-016258 | 1/1996 |
| JP | 10-210787 | 8/1998 |
| JP | 2005-328670 | 11/2005 |
| JP | 2006-087186 | 3/2006 |
| JP | 2008-092690 | 4/2008 |
| WO | 02067255 A1 | 8/2002 |
| WO | 2007056722 A2 | 5/2007 |
| WO | 2008118488 A1 | 10/2008 |

* cited by examiner

FREQUENCY PHASE DETECTION THREE PHASE SYSTEM

BACKGROUND

The use of three phase systems is prevalent. For example, three phase power may be used in connection with a motor or generator. Ideally, in a balanced system, the vector summation of the three phases is equal to zero. For example, in a theoretical balanced system, each phase may be one-hundred twenty (120) degrees apart, the three phases may have the same frequency, and the magnitudes associated with each phase may be equal to one another. In actual practice, these assumptions frequently do not hold. Variations in components or devices used to generate the three phases may cause non-idealities to arise, such as a difference in magnitude and phase of a first phase relative to the other two phases. Other non-idealities may be harmonics, loading, rectification, switching, or EMI.

In some instances, when operating a three phase system, it may be desirable to monitor the system. For example, it may be necessary or mandatory to monitor the system when the system is used to generate power, is implemented in safety equipment, or is used in any other application environment, in order to ensure correct operation. Improvements are needed to more effectively monitor a three phase system.

BRIEF SUMMARY

In some embodiments, a device may be configured to monitor operation of a three phase system, the device including: a circuit that maximizes a signal-to-noise ratio of a measurement associated with the monitoring; and a monitor to generate a message that provides a status of the three phase system based on an output of the circuit.

In some embodiments, a method may comprise monitoring, by a device, by generating at least three vectors associated with a three phase system's operation; applying a first gain to a first and a second of the at least three vectors; applying a second gain, different from the first gain, to a third of the at least three vectors; generating, by the device, an output vector corresponding to a combination of the at least three vectors, the combination maximizing a signal-to-noise ratio by maximizing the second gain; and causing, by the device, a message to be generated that provides a status of the monitoring.

In some embodiments, a first circuit configured to generate at least three vectors associated with a three phase system's operation by maximizing a gain of a third of the at least three vectors relative to a gain associated with each of a first and a second vector of the at least three vectors and filtering frequency content outside of a specified range associated with a fundamental frequency of the three phase system; and a second circuit coupled to the first circuit and configured to generate an output vector by combining the at least three vectors.

Other aspects of the disclosure are described below.

BRIEF DESCRIPTION OF THE DRAWINGS

The present disclosure is illustrated by way of example and not limited in the accompanying figures, in which.

DETAILED DESCRIPTION

Figure 1:
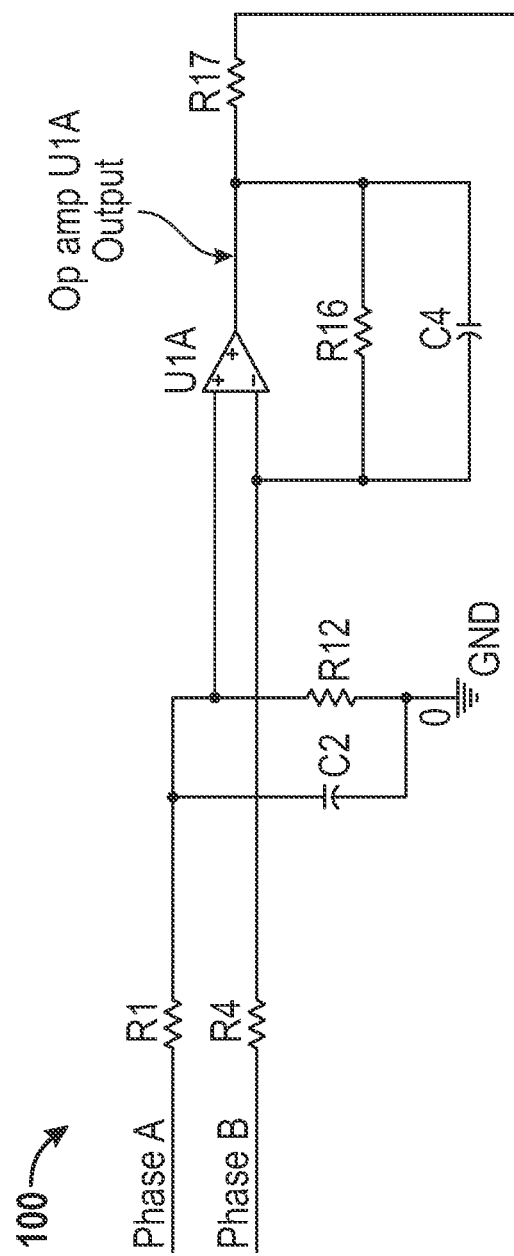
FIG. 1 illustrates an exemplary differential monitoring and filtering circuit in accordance with one or more aspects of the disclosure.

In accordance with various aspects of the disclosure, the operation of a three phase system may be monitored. In some embodiments, the monitoring may occur via the use of mechanical components and/or electrical components. In some embodiments, the monitoring may be based on a differential monitoring. In some embodiments, the monitoring may be based or dependent on a common or a neutral; such monitoring may be used in connection with 'delta' or 'Y' configurations.

It is noted that various connections are set forth between elements in the following description and in the drawings (the contents of which are included in this disclosure by way of reference). It is noted that these connections in general and, unless specified otherwise, may be direct or indirect and that this specification is not intended to be limiting in this respect. In this regard, a coupling of entities, components, and/or devices may refer to either a direct connection or an indirect connection.

FIG. 1 illustrates an exemplary differential monitoring and filtering circuit 100. Circuit 100 may be used to generate a vector that represents a difference between the first two phases (e.g., phase A and phase B) of the three phase system. The vector may be generated using an op amp (denoted as U1A in FIG. 1) implemented in a differential amplifier circuit configuration. To this end, a resistor R1 may be coupled to a first phase (e.g., phase A) of the three phase system and a non-inverting input (e.g., the '+' input) of op amp U1A. Resistor R1 may be coupled to a resistor R12. Resistor R12 may be coupled to resistor R1, the non-inverting input of op amp U1A and ground (GND) as shown in FIG. 1. A resistor R4 may be coupled to a second phase (e.g., phase B) of the three phase system and an inverting input (e.g., the '−' input) of op amp U1A. Resistor R4 may be coupled to a resistor R16. Resistor R16 may be coupled to resistor R4, the inverting input of op amp U1A, an output of the op amp U1A, and optionally a resistor R17.

Resistors R1, R4, R12, and R16 may form the gain of circuit 100. The values of resistors R1 and R4 may be equal (e.g., 100K) and the values of resistors R12 and R16 may be equal (e.g., 10K). In some embodiments, one or more of the resistors (e.g., resistors R1 and R4) may be selected so as to represent high impedance with respect to the three phase system without being so large as to be comparable (e.g., on the same order of magnitude) to the input impedance of the op amp U1A. In some embodiments, the values of the resistors may be selected to scale down the sensing voltage. For example, a resistor R17 may be used in some embodiments to scale down a final output voltage in some embodiments.

In one or more exemplary embodiments, capacitors may be used for purposes of filtering or other purposes. For example, capacitors C2 and C4 of circuit 100 may be used to filter or remove content other than the fundamental frequency of the three phase system. As shown in FIG. 1, a first end or terminal of capacitor C2 may be coupled to resistor R1, resistor R12 and the non-inverting input of op amp U1A. A second end or terminal of capacitor C2 may be coupled to resistor R12 and GND. A first end or terminal of capacitor C4 may be coupled to resistor R4, resistor R16, and the inverting input of op amp U1A. A second end or terminal of capacitor C4 may be coupled to resistor R16, the output of op amp U1A, and resistor R17. Harmonics or unwanted frequency content associated with the three phase system or any other system may be removed as a result of the filtering.

Any type of component may be used to provide filtering. For example, in some embodiments, one or more inductors may be used. Furthermore, any type of filtering may be used. For example, low-pass filtering, high-pass filtering, band-pass filtering, and the like may be used in some embodiments. In some embodiments, a filter may be implemented using hardware, software, firmware, or any combination thereof. Furthermore the characteristics of the filter may be adapted or modified in some embodiments. For example, an attenuation factor, profile, or roll-off of the filter may be selected for a given application by choosing a particular filter configuration. First or higher-order filters may be used in some embodiments.

Figure 2A:
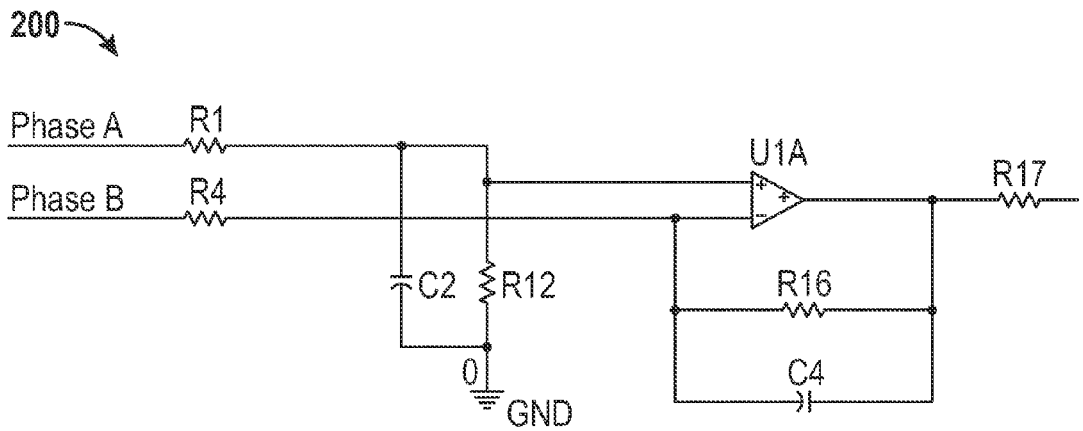
FIGS. 2A-2C illustrate an exemplary differential monitoring and filtering circuit for three phases in accordance with one or more aspects of this disclosure.
Figure 2B:
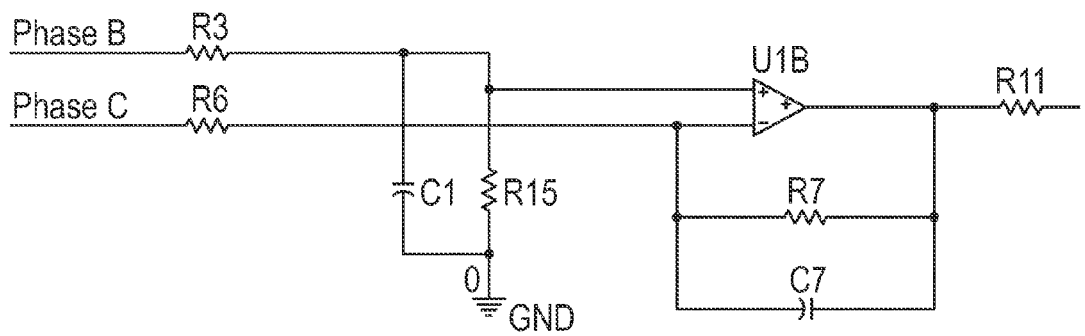
Figure 2C:
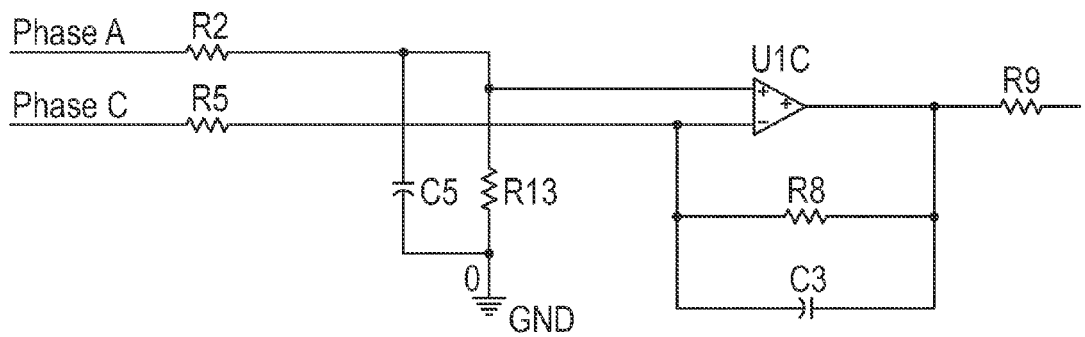

FIGS. 2A-2C collectively illustrate an exemplary differential monitoring and filtering circuit 200 for three phases. The portion of circuit 200 corresponding to FIG. 2A is the same as circuit 100. For the sake of brevity, a complete (re)description of the portion of circuit 200 corresponding to FIG. 2A is omitted.

The portion of circuit 200 corresponding to FIG. 2B may be used to generate a vector that represents a difference between the second and third phases (e.g., phase B and phase C) of the three phase system. The portion of circuit 200 corresponding to FIG. 2C may be used to generate a vector that represents a difference between the first and third phases (e.g., phase A and phase C) of the three phase system.

The configurations shown in FIGS. 2B and 2C are analogous to the configuration of circuit 100 and the portion of circuit 200 corresponding to FIG. 2A. In fact, the values for the components in FIG. 2B may be the same as the corresponding components shown in FIG. 2A. The values for at least some of the components in FIG. 2C may be different from the values for the corresponding components in FIGS. 2A and 2B. For example, R13 (e.g., 5K) is different from R12 and R15 (e.g., 10K), R8 (e.g., 5K) is different from R7 and R16 (e.g., 10K), C5 (e.g., 2 nF) is different from C1 and C2 (e.g., 1 nF), and C3 (e.g., 2 nF) is different from C7 and C4 (e.g., 1 nF). As a result of the different values for components used in FIG. 2C, a different gain or filter response for the FIG. 2C circuit may be obtained relative to the circuits of FIGS. 2A and 2B.

In some embodiments, a circuit may be configured to generate three vectors, each vector corresponding to a difference of two of the three phases of a three phase system. In some embodiments, each vector may correspond to the magnitude of each phase relative to a common reference.

As previously described, the vector sum of the three vectors in a(n ideal) three phase balanced system would be zero. Such a vector summation might be of minimal value, as the vector resulting from the summation may be indicative of noise in the system. Changing the gain on one of the vectors (e.g., the vector generated at the output of FIG. 2C) relative to the other two vectors (e.g., the vectors generated at the outputs of FIGS. 2A and 2B), and then summing the three vectors together (e.g., summing the outputs of FIGS. 2A-2C together) may generate a rotating vector indicative of, e.g., a frequency or phase of a rotor. The change in gain, and the resulting output vector, may enhance the signal-to-noise ratio (SNR) of the measurement or monitoring activity.

Figure 3:
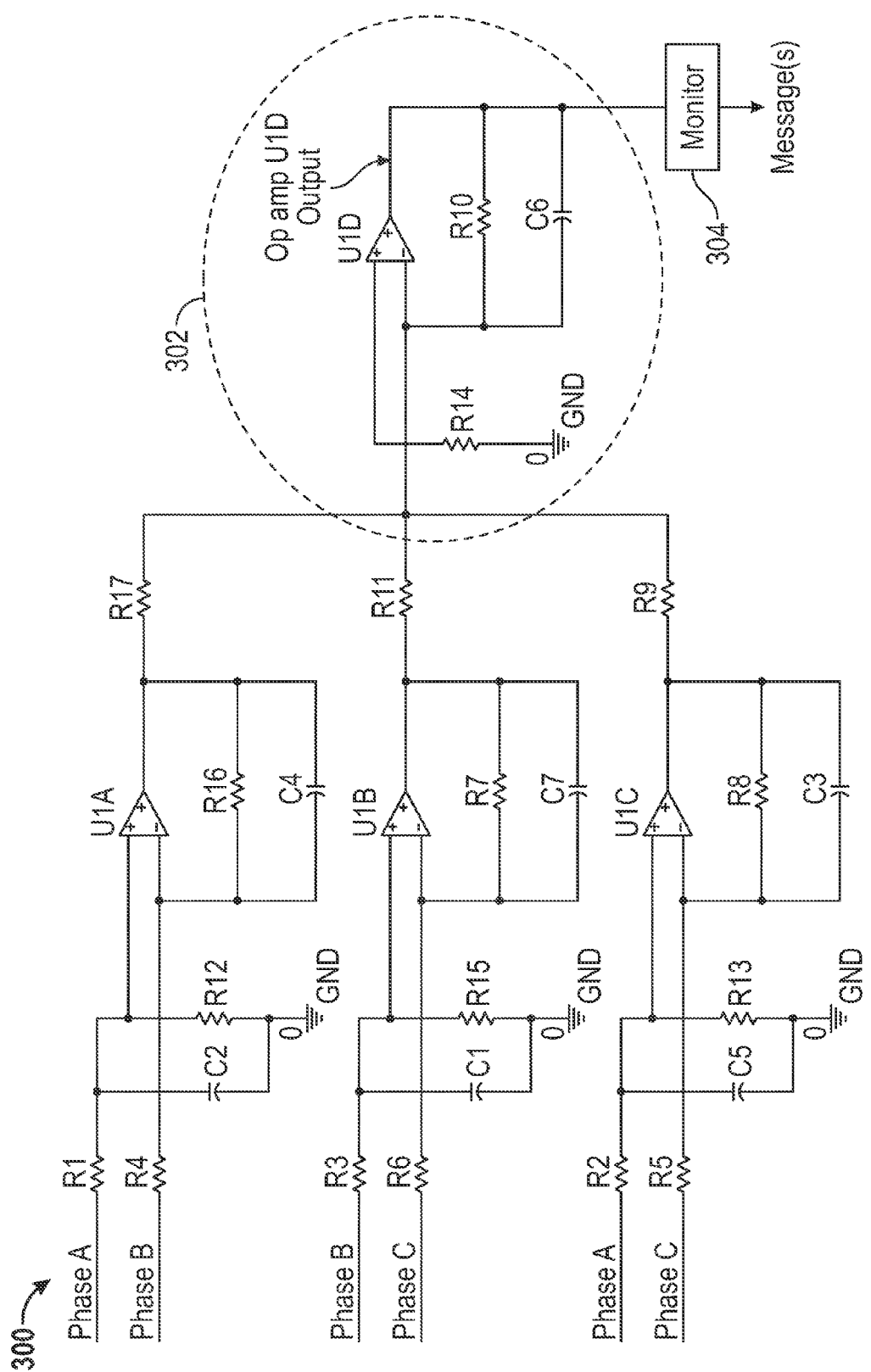
FIG. 3 illustrates an exemplary differential monitoring and summing circuit in accordance with one or more aspects of this disclosure.

Circuit 300 of FIG. 3 represents the summation of the three vectors associated with circuit 200 shown and described with reference to FIGS. 2A-2C. A portion of circuit 300 associated with op amp U1D and indicated by circle 302 is arranged in an adder configuration. The output of op amp U1D may represent an addition of the vectors associated with circuit 200 of FIGS. 2A-2C. The filter formed by a capacitor C6 may be used as a good design practice to eliminate or filter unwanted frequencies. In some embodiments, capacitor C6 may be 1 nF. A resistor R14 may be used to balance offset error. In some embodiments, resistor R14 may be 2.5K.

Circuit 300 may be redundant in the sense that any one of the phases can open and the design may still detect the frequency or phase that is being monitored. It may also be possible that two phases can open and the design may still work depending on, e.g., the overall configuration of the grounding and a coupling capacitance to a generator.

In some embodiments, the output of op amp U1D may be coupled to a monitor 304 as shown in FIG. 3. Monitor 304 may be configured to generate and/or provide one or more messages. The messages may provide a status or information associated with the operation of the three phase system, such as phase or frequency information.

The values, types, or brands of any of the components (e.g., the resistors, capacitors, op amp) shown in any of the preceding figures may be modified to achieve a particular or specified result. In some embodiments, one or more of the components may be optional. In some embodiments, additional components not shown may be included. In some embodiments, the components may be arranged different from what is shown.

Figure 4:
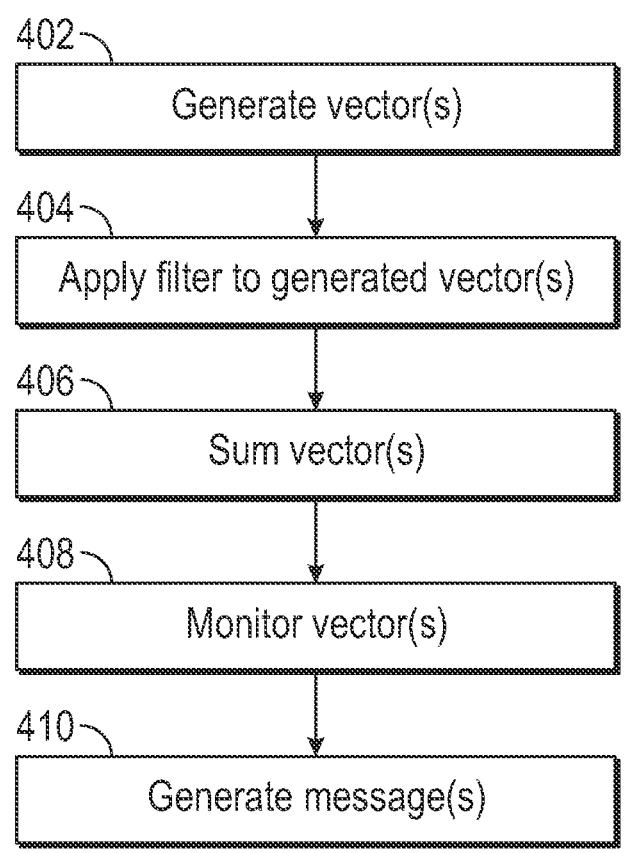
FIG. 4 illustrates an exemplary method in accordance with one or more aspects of this disclosure.

FIG. 4 illustrates a method in accordance with one or more aspects of this disclosure. In some embodiments, the method may execute in accordance with one or more circuits, such as the circuits described herein. The method of FIG. 4 may be used to generate a vector that represents the frequency and/or phase of a three phase system. The method may be implemented using hardware, software, firmware, or any combination thereof.

As shown in FIG. 4, in step 402 one or more vectors may be generated. For example, a first vector may correspond to a difference of the first two phases of a three phase system. A second vector may correspond to a difference of the second and third phases of the three phase system. A third vector may correspond to a difference of the first and third phases of the three phase system. In some embodiments, a gain associated with one of the vectors (e.g., the third vector) may be different from the gain associated with the other two vectors (e.g., the first and second vectors). In some embodiments, one or more of the gains may be maximized.

In step 404, filtering may be applied to the vectors generated in step 402. For example, filtering may be performed to remove content other than content of interest. For example, filtering may be performed to retain a fundamental frequency and remove other frequencies. While shown in FIG. 4 as a separate step, in some embodiments step 404 may be associated with the vector generation of step 402.

In step 406, a vector summation may occur. For example, the vectors generated in step 402 (subject to any potential filtering associated with step 404) may be added together to produce a resultant or output vector. The output vector may include information associated with the operation of the three phase system, such as frequency or phase information.

In step 408, a monitoring of one or more of the vectors may occur. For example, one or more of the vectors generated in connection with steps 402 and 406 may be monitored. The monitoring may be based at least in part on comparing the vector(s) to one or more tolerances or thresholds. The tolerance(s)/threshold(s) may be pre-determined based on the application, in response to one or more inputs or conditions, etc.

In step 410, one or more message(s) may be generated. For example, the message(s) may be based at least in part on the monitoring of step 408. In some embodiments, the message (s) may indicate the value(s) of the vector(s), a timestamp associated with the vector(s), or any other status. In some embodiments, one or more of the messages may be stored in a memory or other storage device. The storage may be used to generate a report regarding the operation of the three phase system, troubleshoot the three phase system, maintain/repair the three phase system, service the three phase system, etc. This step could be done by the monitor 304 shown in FIG. 3.

The steps shown in FIG. 4 are illustrative. In some embodiments, some of the steps (or portions thereof) may be optional. In some embodiments, additional steps not shown may be included. In some embodiments, the steps may execute in an order or sequence different from what is shown.

Embodiments of the disclosure may be implemented via hardware or software, or a combination thereof. For example, a vector summation (e.g., step 406) and/or a monitoring of one or more vectors (e.g., step 408) may occur using hardware and/or software. Hardware may be used to sense (e.g., one or more outputs of) the three phase system.

In some embodiments various functions or acts may take place at a given location and/or in connection with the operation of one or more apparatuses or systems. In some embodiments, a portion of a given function or act may be performed at a first device or location, and the remainder of the function or act may be performed at one or more additional devices or locations. Aspects of the disclosure may be directed to one or more systems, apparatuses, and methods.

Aspects of the disclosure may be tied to particular machines. For example, in some embodiments one or more circuits may be used to monitor or sense the operation of a three phase system. In some embodiments, differential monitor circuits may be used.

Aspects of the disclosure may transform an article into a different state or thing. For example, a vector having a low signal-to-noise ratio (SNR) and subject to harmonics may be transformed into a vector having: (1) a high SNR, and/or (2) content indicative of a frequency of interest, such as a fundamental frequency of a three phase system. In some embodiments, the SNR associated with the output vector may be maximized.

Aspects of the disclosure have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure.

What is claimed is:

1. An apparatus comprising:
    a device configured to monitor operation of a three phase system, the device including:
    a circuit that maximizes a signal-to-noise ratio of a measurement associated with the monitoring, the circuit including a filter configured to retain a fundamental frequency of the three phase system and remove other frequencies; and
    a monitor to generate a message that provides a status of the three phase system based on an output of the circuit, wherein the circuit is configured to generate three vectors, each vector corresponding to a difference of two of the three phases of the three phase system or the magnitude of each phase relative to a common reference, and a first gain associated with two of the three vectors is the same, and a second gain associated with a third of the three vectors is different from the first gain or a combination of gains which results in a rotating vector.

2. The apparatus of claim 1, wherein the second gain corresponds to the measurement having the maximized signal-to-noise ratio.

3. The apparatus of claim 1, wherein the circuit is configured to generate an output vector by adding the three vectors.

4. The apparatus of claim 1, wherein the filter comprises at least one of a capacitor and an inductor.

5. The apparatus of claim 1, wherein the filter comprises at least one of a low-pass filter, a high-pass filter, and a band-pass filter.

6. The apparatus of claim 1, wherein the three phase system is arranged as one of a delta configuration and a Y configuration, and wherein the device is configured to monitor the operation of the three phase system based on a common of the delta or Y configuration.

7. The apparatus of claim 1, wherein the maximization of the signal-to-noise ratio is based on voltages available in the device and the components that are used in the device.

8. The apparatus of claim 1, wherein the device is configured to cause the message to be stored.

9. A method comprising:
    monitoring, by a device, at least one of a frequency and a phase of a three phase system by generating at least three vectors associated with the three phase system's operation;
    applying a first gain to a first and a second of the at least three vectors;
    applying a second gain, different from the first gain, to a third of the at least three vectors; and
    generating, by the device, an output vector corresponding to a combination of the at least three vectors, the combination maximizing a signal-to-noise ratio by maximizing the second gain, and
    removing harmonics generated by the three phase system by filtering frequency content outside of a specified range associated with a fundamental frequency of the three phase system.

10. The method of claim 9, wherein the maximization of the signal-to-noise ratio is based on voltages available in the device and the components that are used in the device.

11. The method of claim 9, wherein the device comprises an electrical circuit, the method further comprising:
    generating the at least three vectors as differential vectors, where a first of the differential vectors corresponds to a difference of a first phase and a second phase of the three phase system, a second of the differential vectors corresponds to a difference of the second phase and a third phase of the three phase system, and a third of the differential vectors corresponds to a difference of the first phase and the third phase.

12. The method of claim 9, further comprising:
    generating the output vector by summing at least three vectors.

13. An apparatus comprising:
    a first circuit configured to generate at least three vectors associated with a three phase system's operation by maximizing a gain of a third of the at least three vectors relative to a gain associated with each of a first and a second vector of the at least three vectors and filtering frequency content outside of a specified range associated with a fundamental frequency of the three phase system; and a second circuit coupled to the first circuit and configured to generate an output vector by combining the at least three vectors, wherein the second circuit is configured to generate the output vector by adding the at least three vectors, and wherein the second circuit comprises a filter configured to retain a fundamental frequency of the three phase system and remove other frequencies and a resistor configured to balance offset error, and wherein the three phase system is associated with at least one of a generator and a motor.

14. The apparatus of claim 13, wherein the first circuit comprises three differential amplifier circuits, and wherein each differential amplifier circuit is configured to generate a corresponding one of the at least three vectors as a difference of a corresponding two of the three phases of the three phase system.

* * * * *